US009611380B2

(12) United States Patent
Thomasson et al.

(10) Patent No.: US 9,611,380 B2
(45) Date of Patent: Apr. 4, 2017

(54) ELASTOMERIC COMPOSITION EXHIBITING GOOD DISPERSION OF THE FILLER IN THE ELASTOMERIC MATRIX

(75) Inventors: Damien Thomasson, Clermont-Ferrand (FR); Marc Sevignon, Clermont-Ferrand (FR)

(73) Assignees: MICHELIN RECHERCHE ET TECHNIQUE S.A., Granges-Paccot (CH); COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 0 days.

(21) Appl. No.: 13/994,850

(22) PCT Filed: Dec. 9, 2011

(86) PCT No.: PCT/EP2011/072287
§ 371 (c)(1),
(2), (4) Date: Aug. 12, 2013

(87) PCT Pub. No.: WO2012/080109
PCT Pub. Date: Jun. 21, 2012

(65) Prior Publication Data
US 2013/0317137 A1 Nov. 28, 2013

(30) Foreign Application Priority Data

Dec. 17, 2010 (FR) .................................... 10 60687

(51) Int. Cl.
*C08K 3/04* (2006.01)
*C08L 7/00* (2006.01)
*C08J 3/22* (2006.01)
*C08K 3/36* (2006.01)

(52) U.S. Cl.
CPC ................ *C08L 7/00* (2013.01); *C08J 3/226* (2013.01); *C08K 3/04* (2013.01); *C08K 3/36* (2013.01); *C08J 2409/00* (2013.01); *C08J 2421/02* (2013.01)

(58) Field of Classification Search
CPC .............. C08J 3/226; C08K 3/04; C08K 3/36
USPC .......................... 523/333, 351; 524/492, 495
See application file for complete search history.

(56) References Cited

U.S. PATENT DOCUMENTS

| 3,700,621 | A | 10/1972 | Burke, Jr. |
| 5,693,712 | A | 12/1997 | Urban et al. |
| 5,977,238 | A | 11/1999 | Labauze |
| 6,013,718 | A | 1/2000 | Cabioch et al. |
| 6,040,364 | A | 3/2000 | Mabry |
| 6,048,923 | A | 4/2000 | Mabry et al. |
| 6,075,084 | A | 6/2000 | Mabry |
| 6,211,271 | B1 | 4/2001 | Garro et al. |
| 6,503,973 | B2 | 1/2003 | Robert et al. |
| 6,774,255 | B1 | 8/2004 | Tardivat et al. |
| 6,815,473 | B2 | 11/2004 | Robert et al. |
| 2001/0034389 | A1 | 10/2001 | Vasseur |
| 2002/0086917 | A1* | 7/2002 | Chung et al. ................. 523/351 |
| 2003/0125474 | A1 | 7/2003 | Yatsuyanagi |
| 2003/0212185 | A1 | 11/2003 | Vasseur |
| 2004/0051210 | A1 | 3/2004 | Tardivat et al. |
| 2004/0092648 | A1 | 5/2004 | Jones |
| 2004/0132880 | A1 | 7/2004 | Durel et al. |
| 2004/0167705 | A1 | 8/2004 | Lingman |
| 2005/0016650 | A1 | 1/2005 | Durel et al. |
| 2005/0016651 | A1 | 1/2005 | Durel et al. |
| 2006/0089445 | A1 | 4/2006 | Gandon-Pain |
| 2006/0111475 | A1 | 5/2006 | Mabry et al. |
| 2007/0112120 | A1 | 5/2007 | Vasseur |
| 2009/0018238 | A1 | 1/2009 | Yanagisawa |
| 2009/0186961 | A1 | 7/2009 | Araujo Da Silva et al. |
| 2009/0209709 | A1 | 8/2009 | Araujo Da Silva et al. |
| 2009/0234066 | A1 | 9/2009 | Araujo Da Silva et al. |
| 2009/0308513 | A1* | 12/2009 | Ota ............................ 152/209.5 |
| 2010/0048799 | A1 | 2/2010 | Miyazaki |
| 2010/0184912 | A1 | 7/2010 | Marechal et al. |
| 2010/0249270 | A1 | 9/2010 | Robert et al. |

(Continued)

FOREIGN PATENT DOCUMENTS

| CA | 2773920 | 3/2011 |
| CN | 1222878 | 7/1999 |

(Continued)

OTHER PUBLICATIONS

*International Search Report (PCT/ISA/210) issued on Mar. 2, 2012, by the European Patent Office as the International Searching Authority for International Application No. PCT/EP2011/072287.
Australian Office Action for Application No. AU2011344438 dated Feb. 10, 2015.
International Search Report on Application PCT/EP2011/072290 dated Apr. 3, 2012.
International Search Report on Application PCT/EP2012/075140 dated Feb. 20, 2013.
International Search Report on Application PCT/EP2012/071280 dated Feb. 20, 2013.

(Continued)

*Primary Examiner* — Edward Cain
(74) *Attorney, Agent, or Firm* — Dickinson Wright PLLC

(57) ABSTRACT

The invention relates to a rubber composition based on at least one diene elastomer, a reinforcing filler comprising at least carbon black and an inorganic filler with an inorganic filler content of less than or equal to 50 parts by weight per hundred parts of elastomer, characterized in that the composition is obtained from a first masterbatch comprising at least one first diene elastomer and carbon black, and having a dispersion of the carbon black in the elastomeric matrix that has a Z value of greater than or equal to 90, added to which is the inorganic filler and at least one second elastomer, identical to or different from the first elastomer, and also to the process for preparing such a composition.

26 Claims, No Drawings

(56) References Cited

U.S. PATENT DOCUMENTS

| | | |
|---|---|---|
| 2010/0252156 A1 | 10/2010 | Robert et al. |
| 2011/0152458 A1 | 6/2011 | Araujo Da Silva et al. |
| 2012/0277344 A1 | 11/2012 | Wang et al. |

FOREIGN PATENT DOCUMENTS

| | | | |
|---|---|---|---|
| CN | 1352592 | A | 6/2002 |
| CN | 101115785 | | 1/2008 |
| CN | 101654531 | | 2/2010 |
| DE | 100 24 613 | A1 | 11/2000 |
| EP | 0018751 | | 11/1983 |
| EP | 1 127 909 | A1 | 8/2001 |
| EP | 1321488 | | 6/2006 |
| EP | 1 873 191 | A1 | 1/2008 |
| FR | 2 740 778 | A1 | 5/1997 |
| FR | 2 765 882 | A1 | 1/1999 |
| GB | 744509 | | 2/1956 |
| JP | H07278357 | A | 10/1995 |
| JP | 2000119450 | A | 4/2000 |
| JP | 2000507892 | A | 6/2000 |
| JP | 2002521516 | A | 7/2002 |
| JP | 2003292675 | A | 10/2003 |
| JP | 2005220187 | A | 8/2005 |
| JP | 2007161818 | | 6/2007 |
| JP | 2010013552 | | 1/2010 |
| JP | 2010254905 | A | 11/2010 |
| JP | 201157967 | | 3/2011 |
| WO | 9736724 | A2 | 10/1997 |
| WO | 0005301 | A1 | 2/2000 |
| WO | 0062990 | A1 | 10/2000 |
| WO | WO 01/92402 | A1 | 12/2001 |
| WO | WO 02/10269 | A2 | 2/2002 |
| WO | WO 02/30939 | A1 | 4/2002 |
| WO | WO 02/31041 | A1 | 4/2002 |
| WO | WO 02/083782 | A1 | 10/2002 |
| WO | WO 03/002648 | A1 | 1/2003 |
| WO | WO 03/002649 | A1 | 1/2003 |
| WO | 03016837 | A1 | 2/2003 |
| WO | WO 2004/096865 | A2 | 11/2004 |
| WO | WO 2006/125532 | A1 | 11/2006 |
| WO | WO 2006/125533 | A1 | 11/2006 |
| WO | WO 2006/125534 | A1 | 11/2006 |
| WO | WO 2008/141702 | A1 | 11/2008 |
| WO | WO 2009/000750 | A1 | 12/2008 |
| WO | WO 2009/000752 | A1 | 12/2008 |
| WO | 2011034585 | | 3/2011 |

OTHER PUBLICATIONS

ASMT International "Standard Test Method for Carbon Black—Total and External Surface Area by Nitrogen Absorption", Designation: D6556-10, p. 086-1090.

Chapter 3, "Latex concentrates: properties and composition" by K.F. Gaseley, A.D.T. Gordon and T.D. Pendle in "Natural Ribber Science and Technology", A.D. Roberts, Oxford UniversityPress—1988.

C. W. Carr, I. M. Kolthoff, E. J. Meehan, University of Minnesota, Minneapolis, Minnesota which appeared in the Journal of Polymer Science of 1950, vol. V, No. 2, pp. 201-206.

C. W. Carr, I. M. Kolthoff, E. J. Meehan, University of Minnesota, Minneapolis, Minnesota which appeared in the Journal of Polymer Science of 1951, vol. VI, No. 1, pp. 73-81.

1/2 Industrial and Engineering Chemistry, 1948, vol. 40, No. 5, pp. 932-937, E. J. Vandenberg, G. E. Hulse, Hercules Powder Company.

1/2 Industrial and Engineering Chemistry,1954, vol. 46, No. 5, pp. 1065-1073, J. R. Miller, H. E. Diem, B. F. Goodrich Chemical Co., Akron, Ohio.

* cited by examiner

ELASTOMERIC COMPOSITION EXHIBITING GOOD DISPERSION OF THE FILLER IN THE ELASTOMERIC MATRIX

BACKGROUND

1. Field

The invention relates to a rubber composition based on at least one inorganic filler, in particular silica, and on a masterbatch based on a diene elastomer and carbon black, said masterbatch having a very good dispersion of the carbon black in the elastomeric matrix, and the composition having a good dispersion of all of its filler of the composition in its elastomeric matrix.

The term "masterbatch" is understood to mean: an elastomer-based composite into which a filler and optionally other additives have been introduced.

The present invention relates in particular to the use of such a masterbatch for the manufacture of diene rubber compositions reinforced with a blend of organic filler and inorganic filler, which are intended for the manufacture of tyres or of semi-finished products for tyres, in particular treads for these tyres.

2. Description of Related Art

It is known that in order to obtain the optimum reinforcing properties and hysteresis properties imparted by a filler to a tyre tread, and thus to obtain high wear resistance and low rolling resistance, it is generally advisable for this filler to be present in the elastomeric matrix in a final form that is both as finely divided as possible and as uniformly distributed as possible. However, such conditions can be achieved only if this filler has a very good capacity, on the one hand, to be incorporated into the matrix during the mixing with the elastomer and to deagglomerate, and, on the other hand, to disperse uniformly in this matrix.

Since fuel savings and the need to protect the environment have become a priority, it has proved necessary to produce tyres that have a reduced rolling resistance without adversely affecting their wear resistance.

This has been made possible in particular by virtue of the use, in the treads of these tyres, of novel rubber compositions reinforced at least partially with inorganic fillers, in particular specific silicas of the highly dispersible type, that are capable of rivaling from the reinforcing standpoint a conventional tyre-grade carbon black, while offering these compositions a lower hysteresis, which is synonymous with a lower rolling resistance for tyres containing them, and also improved grip on wet, snow-covered or icy ground.

However, for reciprocal affinity reasons, these inorganic filler particles have an annoying tendency to clump together in the elastomeric matrix. These interactions have the deleterious consequence of limiting the dispersion of the filler and therefore the reinforcing properties to a level substantially below that which would be theoretically possible to achieve if all the (inorganic filler/elastomer) bonds capable of being created during the compounding operation were actually obtained. These interactions moreover tend to increase the viscosity in the uncured state of the rubber compositions and therefore to make them more difficult to process than when carbon black is present, even for highly dispersible silicas.

There are various methods for obtaining a masterbatch of diene elastomer and reinforcing filler. In particular, one type of solution consists, in order to improve the dispersibility of the filler in the elastomeric matrix, in compounding the elastomer and the filler in the "liquid" phase. To do so, the process involves an elastomer in latex form, which is in the form of water-dispersed elastomer particles, and an aqueous dispersion of the filler, that is to say a filler dispersed in water, commonly referred to as a "slurry". Certain processes in particular, such as those described in document U.S. Pat. No. 6,048,923, make it possible to obtain a masterbatch of elastomer and filler that has a very good dispersion of the filler in the elastomeric matrix, greatly improved compared to the dispersion of the filler in the elastomeric matrix capable of being obtained during the solid-phase compounding of elastomer and reinforcing filler. This process consists in particular in incorporating a continuous flow of a first fluid consisting of an elastomer latex into the compounding zone of a coagulation reactor, in incorporating a second continuous flow of a second fluid consisting of an aqueous dispersion of filler under pressure into the compounding zone to form a mixture with the elastomer latex, the compounding of these two fluids being sufficiently energetic to make it possible to almost completely coagulate the elastomer latex with the filler before the outlet orifice of the coagulation reactor, and then in drying the coagulum obtained.

This process is particularly suitable for producing a masterbatch that has a very good dispersion, starting from a natural rubber latex and carbon black. Indeed, the application of this process is rendered particularly favourable by the ability that the natural rubber latex and carbon black have to coagulate together spontaneously. Conversely, silica does not coagulate spontaneously with the natural rubber latex since the silica aggregates are typically hydrophilic in nature and have greater affinity with water than with the elastomer particles themselves.

Furthermore, such a process has a limit as regards the content of carbon black present in the masterbatch, however the subsequent incorporation of carbon black in solid form, to increase the overall filler content in the elastomeric matrix, does not make it possible to retain the advantages obtained for the hysteresis. Moreover, this process is also limited in practice, as regards the type of diene elastomer that can be used in order to have a combined coagulation of the carbon black and of the elastomer, to natural rubber; however the advantage of using other elastomers for many tyre applications has been known for a long time.

SUMMARY

The applicant has surprisingly discovered that, contrary to the effect of the addition of carbon black in solid form and of a second elastomer, identical to or different from the first, and contrary to the knowledge of those skilled in the art regarding the difficulties in dispersing and processing silica in an elastomeric matrix, the incorporation of silica and of a second elastomer, including if this second elastomer is different from the first, into a diene elastomer and carbon black masterbatch that has a very good dispersion of the carbon black in the diene elastomer matrix, especially masterbatches prepared according to the aforementioned process, made it possible to obtain novel masterbatches having improved hysteresis while retaining a good dispersion of all of the filler in the elastomeric matrix then consisting of two elastomers.

One subject of the invention is thus a rubber composition based on at least one diene elastomer, a reinforcing filler comprising at least carbon black and an inorganic filler with an inorganic filler content of less than or equal to 50 parts by weight per hundred parts of elastomer, characterized in that the composition is obtained from a first masterbatch comprising at least one first diene elastomer and carbon black, and having a dispersion of the carbon black in the elastomeric matrix that has a Z value of greater than or equal to 90, added to which is the inorganic filler and at least one second elastomer, identical to or different from the first elastomer.

Preferably, this first masterbatch is obtained by liquid-phase compounding starting from a latex of the first diene elastomer and an aqueous dispersion of carbon black, and more preferably still it is obtained according to the following process steps:
- feeding a continuous flow of a latex of a first diene elastomer to a mixing zone of a coagulation reactor defining an elongate coagulation zone extending between the mixing zone and an outlet,
- feeding a continuous flow of a fluid comprising a filler under pressure to the mixing zone of a coagulation reactor to form a coagulated mixture,
- drying the coagulum obtained above in order to recover the first masterbatch.

According to one advantageous embodiment, the weight fraction of the first diene elastomer in the elastomeric matrix is greater than or equal to 50%, and preferably greater than or equal to 60%.

According to one preferred embodiment, the first diene elastomer is selected from the group consisting of polybutadienes, natural rubber, synthetic polyisoprenes, butadiene copolymers, isoprene copolymers and blends of these elastomers, and more preferably the first diene elastomer is a natural rubber.

According to another preferred embodiment, the second elastomer is a diene elastomer. Preferably, the second elastomer is selected from the group consisting of polybutadienes, natural rubber, synthetic polyisoprenes, butadiene copolymers, isoprene copolymers and blends of these elastomers, and more preferably still it is selected from natural rubber, a polybutadiene and a butadiene/styrene copolymer.

According to another preferred embodiment, the second elastomer is selected from non-diene elastomers.

According to yet another preferred embodiment, the inorganic filler of the composition is a silica or a silica-covered carbon black.

Another subject of the invention is a process for obtaining a composition based on at least one diene elastomer, a reinforcing filler comprising at least carbon black and an inorganic filler with an inorganic filler content of less than or equal to 50 parts by weight per hundred parts of elastomer, which comprises the following steps:
- preparing a first masterbatch comprising the diene elastomer and the carbon black, this first masterbatch having a dispersion of the reinforcing filler in the elastomeric matrix that has a Z value greater than or equal to 90,
- incorporating the inorganic filler, the second elastomer and the other constituents of the composition, with the exception of the crosslinking system, into the first masterbatch in a mixer, everything being kneaded thermomechanically until a maximum temperature of between 130° C. and 200° C. is reached,
- cooling the combined mixture to a temperature below 100° C.,
- subsequently incorporating: the crosslinking system,
- kneading everything up to a maximum temperature below 120° C.

According to one preferred embodiment variant of the process, the inorganic filler and the second elastomer are introduced simultaneously and preferably in the form of a pre-prepared second masterbatch.

According to another preferred embodiment variant, the inorganic filler and the second elastomer are introduced separately; the inorganic filler being introduced before or after the second elastomer.

According to another preferred embodiment variant, the introduction of the inorganic filler and/or of the second elastomer is offset in time by a few tens of seconds to a few minutes relative to the introduction of the first masterbatch into the mixer.

Advantageously, the masterbatch is produced in the liquid phase from at least one elastomer latex and a dispersion of carbon black.

The invention also relates to a masterbatch of diene elastomer and reinforcing filler which comprises at least one diene elastomer and a reinforcing filler comprising at least carbon black and an inorganic filler with an inorganic filler content of less than or equal to 50 parts by weight per hundred parts of elastomer, obtained by addition to a first masterbatch comprising at least the diene elastomer and the carbon black, and having a dispersion of the carbon black in the elastomeric matrix that has a Z value greater than or equal to 90, of the inorganic filler and at least one second elastomer, identical to or different from the first elastomer.

Preferably, the first masterbatch is obtained by liquid-phase compounding starting from a diene elastomer latex and an aqueous dispersion of carbon black, and more preferably still it is obtained according to the following process steps:
- feeding a continuous flow of a diene elastomer latex to a mixing zone of a coagulation reactor defining an elongate coagulation zone extending between the mixing zone and an outlet,
- feeding a continuous flow of a fluid comprising a filler under pressure to the mixing zone of a coagulation reactor to form a coagulated mixture,
- drying the coagulum obtained above in order to recover the first masterbatch.

According to one advantageous embodiment, in the masterbatch the weight fraction of the first diene elastomer in the elastomeric matrix is greater than or equal to 50%, and preferably greater than or equal to 60%.

According to one preferred embodiment, the first diene elastomer of the masterbatch is selected from the group consisting of polybutadienes, natural rubber, synthetic polyisoprenes, butadiene copolymers, isoprene copolymers and blends of these elastomers, and more preferably the first diene elastomer is a natural rubber.

According to another preferred embodiment, the second elastomer of the masterbatch is a diene elastomer. Preferably, the second elastomer is selected from the group consisting of polybutadienes, natural rubber, synthetic polyisoprenes, butadiene copolymers, isoprene copolymers and blends of these elastomers, and more preferably still it is selected from natural rubber, a polybutadiene and a butadiene/styrene copolymer.

According to another preferred embodiment, the second elastomer of the masterbatch is selected from non-diene elastomers.

According to yet another preferred embodiment, the inorganic filler of the masterbatch is a silica or a silica-covered carbon black.

The invention also relates to a process for preparing a masterbatch which comprises at least one diene elastomer, a reinforcing filler comprising at least carbon black and an inorganic filler with an inorganic filler content of less than or equal to 50 parts by weight per hundred parts of elastomer, obtained by addition to a first diene elastomer and carbon black masterbatch produced according to the following steps:

feeding a continuous flow of a diene elastomer latex to a mixing zone of a coagulation reactor defining an elongate coagulation zone extending between the mixing zone and an outlet, feeding a continuous flow of a fluid comprising a filler under pressure to the mixing zone of a coagulation reactor to form a coagulated mixture, drying the coagulum obtained above in order to recover the first masterbatch, of the inorganic filler and at least one second elastomer, identical to or different from the first elastomer, by thermomechanically kneading.

According to one preferred embodiment variant of the process, the inorganic filler and the second elastomer are introduced simultaneously and preferably in the form of a pre-prepared second masterbatch.

According to another preferred embodiment variant, the inorganic filler and the second elastomer are introduced separately; the inorganic filler being introduced before or after the second elastomer.

According to another preferred embodiment variant, the introduction of the inorganic filler and/or of the second elastomer is offset in time by a few tens of seconds to a few minutes relative to the introduction of the first masterbatch into the mixer.

A final subject of the invention is a finished or semi-finished article, a tyre tread, a tyre or a semi-finished product comprising a composition as described previously or a masterbatch as described previously.

DETAILED DESCRIPTION OF SPECIFIC EMBODIMENTS

I.—Measurements and Tests

The rubber compositions are characterized, before and after curing, as indicated below.

Mooney Plasticity

Use is made of an oscillating consistometer as described in the French standard NF T 43-005 (1991). The Mooney plasticity measurement is carried out according to the following principle: the composition in the uncured state (i.e. before curing) is moulded in a cylindrical chamber heated to 100° C. After preheating for one minute, the (small-sized) rotor rotates within the test specimen at 2 rpm and the working torque for maintaining this movement is measured after rotating for 4 minutes. The Mooney plasticity (MS 1+4) is expressed in "Mooney units" (MU, with 1 MU=0.83 Newton·meter).

Dispersion

As is known, the dispersion of filler in an elastomeric matrix can be represented by the Z value, which is measured, after crosslinking, according to the method described by S. Otto et al. in Kautschuk Gummi Kunststoffe, 58th edition, NR 7-8/2005, in agreement with the standard ISO 11345.

The calculation of the Z value is based on the percentage of surface area in which the filler is not dispersed ("% undispersed surface area"), as measured by the "disperGRADER+" machine provided with its operating process and its "disperDATA" operating software by the company Dynisco according to the equation:

$$Z=100-(\% \text{ undispersed surface area})/0.35$$

The percentage of undispersed surface area is, itself, measured by a camera that observes the surface area of the sample under incident light at 30°. The light points are associated with the filler and agglomerates, whilst the dark points are associated with the rubber matrix; digital processing converts the image into a black and white image, and enables the determination of the percentage of undispersed surface area, as described by S. Otto in the aforementioned document.

The higher the Z value, the better the dispersion of the filler in the elastomeric matrix (a Z value of 100 corresponding to a perfect dispersion and a Z value of 0 to a mediocre dispersion). A Z value greater than or equal to 80 will be considered to correspond to a surface area having a very good dispersion of the filler in the elastomeric matrix.

Tensile Tests

These tensile tests make it possible to determine the elasticity stresses and the properties at break. Unless otherwise indicated, they are carried out in accordance with the French standard NF T 46-002 of September 1988. At second elongation (i.e. after an accommodation cycle at the extension rate provided for the measurement itself) the nominal secant modulus (or apparent stress, in MPa) is measured at 100% elongation (denoted by MA100). The tensile measurements for determining the secant accommodated moduli are carried out at a temperature of 23° C.±2° C., and under standard hygrometry conditions (50%±5% relative humidity).

The stresses at break (in MPa) and elongations at break (in %) are also measured. All these tensile measurements are carried out at a temperature of 60° C.±2° C., and under standard hygrometry conditions (50%±5% relative humidity), according to the French standard NF T 40-101 (December 1979).

Dynamic Properties

The dynamic properties and in particular $\tan(\delta)_{max}$, representative of the hysteresis, are measured on a viscosity analyser (Metravib VA4000), according to the standard ASTM D 5992-96. The response of a sample of vulcanized composition (cylindrical test specimen with a thickness of 4 mm and with a cross section of 400 mm²), subjected to a simple alternating sinusoidal shear stress, at a frequency of 10 Hz, is recorded under standard temperature conditions (23° C.) according to the standard ASTM D 1349-99, or, depending on the case, at a different temperature; in particular in the examples cited, the measurement temperature is 60° C. A peak-to-peak strain amplitude sweep is carried out from 0.1% to 50% (forward cycle) and then from 50% to 0.1% (return cycle). The results made use of are the complex dynamic shear modulus (G*) and the loss factor $\tan(\delta)$. For the return cycle, the maximum value of $\tan(\delta)$ observed, denoted by $\tan(\delta)_{max}$, is indicated.

II. Detailed Description of the Invention

The invention relates to a composition based on at least one diene elastomer, a reinforcing filler comprising at least carbon black and an inorganic filler with an inorganic filler content of less than or equal to 50 parts by weight per hundred parts of elastomer, this composition being obtained from a first masterbatch comprising at least one first diene elastomer and carbon black, and having a dispersion of the carbon black in the elastomeric matrix that has a Z value of greater than or equal to 90, added to which is the inorganic filler and at least one second elastomer, identical to or different from the first elastomer.

It will be noted that in the concept of phr: "parts by weight per hundred parts of elastomer", the whole of all of the elastomers present in the final composition is taken into consideration.

In the present description, unless expressly indicated otherwise, all the percentages (%) shown are % by weight. Furthermore, any range of values denoted by the expression "between a and b" represents the field of values ranging from more than a to less than b (that is to say limits a and b excluded) whereas any range of values denoted by the expression "from a to b" means the field of values ranging from a up to b (that is to say including the strict limits a and b).

II-1) Elastomer

As is customary, the terms "elastomer" and "rubber", which are interchangeable, are used without distinction in the text.

The composition in accordance with the invention comprises at least one first diene elastomer and a second elastomer identical to or different from the first, which therefore may or may not be a diene elastomer.

A "diene" elastomer or rubber should be understood, in a known manner, to mean an elastomer resulting at least in part (i.e., a homopolymer or a copolymer) from diene monomers (monomers bearing two carbon-carbon double bonds which may or may not be conjugated).

These diene elastomers can be classified into two categories: "essentially unsaturated" or "essentially saturated". Generally, the expression "essentially unsaturated" is understood to mean a diene elastomer resulting at least in part from conjugated diene monomers having a content of units of diene origin (conjugated dienes) which is greater than 15% (mol %); thus it is that diene elastomers such as butyl rubbers or diene/α-olefin copolymers of the EPDM type do not fall under the preceding definition and may especially be described as "essentially saturated" diene elastomers (low or very low content of units of diene origin, always less than 15%). In the category of "essentially unsaturated" diene elastomers, the expression "highly unsaturated" diene elastomer is understood to mean in particular a diene elastomer having a content of units of diene origin (conjugated dienes) which is greater than 50%.

Among these diene elastomers, natural rubber and synthetic elastomers are furthermore distinguished.

By synthetic diene elastomers capable of being used in accordance with the invention, the expression "diene elastomer" is understood more particularly to mean:

(a)—any homopolymer obtained by polymerization of a conjugated diene monomer having from 4 to 12 carbon atoms;

(b)—any copolymer obtained by copolymerization of one or more conjugated dienes with one another or with one or more vinylaromatic compounds having from 8 to 20 carbon atoms;

(c)—a ternary copolymer obtained by copolymerization of ethylene and of an α-olefin having from 3 to 6 carbon atoms with an unconjugated diene monomer having from 6 to 12 carbon atoms, such as, for example, the elastomers obtained from ethylene and propylene with an unconjugated diene monomer of the aforementioned type, such as, in particular, 1,4-hexadiene, ethylidene norbornene or dicyclopentadiene; and (d)—a copolymer of isobutene and of isoprene (butyl rubber) and also the halogenated versions, in particular chlorinated or brominated versions, of this type of copolymer.

The following are suitable in particular as conjugated dienes: 1,3-butadiene, 2-methyl-1,3-butadiene, 2,3-di($C_1$-$C_5$ alkyl)-1,3-butadienes, such as for example 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene. The following, for example, are suitable as vinylaromatic compounds: styrene, ortho-, meta- or para-methyl styrene, the commercial "vinyl-toluene" mixture, para-(tert-butyl)styrene, methoxystyrenes, chlorostyrenes, vinylmesitylene, divinylbenzene or vinylnaphthalene.

The copolymers may contain between 99% and 20% by weight of diene units and between 1% and 80% by weight of vinylaromatic units. The elastomers may have any microstructure, which depends on the polymerization conditions used, in particular on the presence or absence of a modifying and/or randomizing agent, and on the amounts of modifying and/or randomizing agent employed. The elastomers may, for example, be block, statistical, sequential or microsequential elastomers and may be prepared in dispersion or in solution; they may be coupled and/or star-branched or else functionalized with a coupling and/or star-branching or functionalization agent. Mention may be made for example, for coupling to carbon black, of functional groups comprising a C—Sn bond or aminated functional groups, such as aminobenzophenone for example; mention may be made for example, for coupling to an inorganic filler such as silica, of silanol or polysiloxane functional groups having a silanol end (such as described for example in FR 2 740 778 or U.S. Pat. No. 6,013,718 and WO 2008/141702), alkoxysilane groups (such as described for example in FR 2 765 882 or U.S. Pat. No. 5,977,238), carboxyl groups (such as described for example in WO 01/92402 or U.S. Pat. No. 6,815,473, WO 2004/096865 or US 2006/0089445) or else polyether groups (such as described for example in EP 1 127 909 or U.S. Pat. No. 6,503,973, WO 2009/000750 and WO 2009/000752). Mention may also be made, as other examples of functionalized elastomers, of elastomers (such as SBR, BR, NR or IR) of the epoxidized type.

The following are suitable: polybutadienes, in particular those having a content (mol %) of 1,2-units of between 4% and 80% or those having a content (mol %) of cis-1,4-units of greater than 80%, polyisoprenes, butadiene/styrene copolymers and in particular those having a Tg (glass transition temperature, Tg, measured according to ASTM D3418) of between 0° C. and −70° C. and more particularly between −10° C. and −60° C., a styrene content of between 5% and 60% by weight and more particularly between 20% and 50%, a content (mol %) of 1,2-bonds of the butadiene part of between 4% and 75% and a content (mol %) of trans-1,4-bonds of between 10% and 80%, butadiene/isoprene copolymers and especially those having an isoprene content of between 5% and 90% by weight and a Tg of −40° C. to −80° C., or isoprene/styrene copolymers and especially those having a styrene content of between 5% and 50% by weight and a Tg of between −5° C. and −50° C. In the case of butadiene/styrene/isoprene copolymers, those having a styrene content of between 5% and 50% by weight and more particularly of between 10% and 40%, an isoprene content of between 15% and 60% by weight and more particularly of between 20% and 50%, a butadiene content of between 5% and 50% by weight and more particularly of between 20% and 40%, a content (mol %) of 1,2-units of the butadiene part of between 4% and 85%, a content (mol %) of trans-1,4-units of the butadiene part of between 6% and 80%, a content (mol %) of 1,2-plus 3,4-units of the isoprene part of between 5% and 70% and a content (mol %) of trans-1,4-units of the isoprene part of between 10% and 50%, and more generally any butadiene/styrene/isoprene copolymer having a Tg of between −5° C. and −70° C., are suitable in particular.

To summarize, the synthetic diene elastomer or elastomers according to the invention are preferably selected from the group of highly unsaturated diene elastomers formed by polybutadienes (abbreviated to "BR"), synthetic polyisoprenes (IR), butadiene copolymers, isoprene copolymers, and blends of these elastomers. Such copolymers are more preferably selected from the group consisting of butadiene/styrene copolymers (SBR), isoprene/butadiene copolymers (BIR), isoprene/styrene copolymers (SIR) and isoprene/butadiene/styrene copolymers (SBIR).

As was specified above, liquid-phase compounding processes are preferably used to make it possible to obtain masterbatches based on diene elastomer and on carbon black that have a very good dispersion of the carbon black in the elastomer. Thus, especially for the production of the first masterbatch of diene elastomer and carbon black, use will more particularly be made of a diene elastomer latex, the elastomer latex being a particular form of the elastomer that is in the form of water-dispersed elastomer particles.

The invention therefore preferably relates to latices of diene elastomers, the diene elastomers being those defined above.

More particularly, for natural rubber (NR) which is particularly suitable for the invention, this natural rubber exists in various forms as explained in detail in Chapter 3 "Latex concentrates: properties and composition" by K. F. Gaseley, A. D. T. Gordon and T. D. Pendle in "Natural Rubber Science and Technology", A. D. Roberts, Oxford University Press—1988.

In particular, several forms of natural rubber latex are sold: the natural rubber latices referred to as "field latices", the natural rubber latices referred to as "concentrated natural rubber latices", epoxidized latices (ENR), deproteinized latices or else prevulcanized latices. The natural rubber field latex is a latex in which ammonia has been added to prevent premature coagulation and the concentrated natural rubber latex corresponds to a field latex that has undergone a treatment corresponding to a washing followed by a further concentration. The various categories of concentrated natural rubber latices are listed in particular according to the standard ASTM D 1076-06. Distinguished in particular from among these concentrated natural rubber latices are the concentrated natural rubber latices of quality referred to as: "HA" (high ammonia) and of quality referred to as "LA"; for the invention, use will advantageously be made of concentrated natural rubber latices of HA quality.

The NR latex may be physically or chemically modified beforehand (centrifugation, enzyme treatment, chemical modifier, etc.).

The latex may be used directly or may be first diluted in water to facilitate the processing thereof.

Thus, as synthetic elastomer latex, the latex may in particular consist of a synthetic diene elastomer already available in the form of an emulsion (for example a butadiene/styrene copolymer, SBR, prepared in emulsion), or of a synthetic diene elastomer initially in solution (for example an SBR prepared in solution) which is emulsified in a mixture of organic solvent and water, generally by means of a surfactant.

An SBR latex, especially an SBR prepared in emulsion ("ESBR") or an SBR prepared in solution ("SSBR"), and more particularly an SBR prepared in emulsion, is particularly suitable for the invention.

There are two main types of processes for the copolymerization, in emulsion, of styrene and butadiene, one of them, or the hot process (carried out at a temperature close to 50° C.), being suitable for the preparation of highly branched SBRs whereas the other, or the cold process (carried out at a temperature which may range from 15° C. to 40° C.), makes it possible to obtain more linear SBRs.

For a detailed description of the effectiveness of several emulsifiers that can be used in said hot process (as a function of the contents of said emulsifiers), reference may for example be made to the two articles by C. W. Carr, I. M. Kolthoff, E. J. Meehan, University of Minnesota, Minneapolis, Minn. which appeared in the Journal of Polymer Science of 1950, Vol. V, No. 2, pp. 201-206, and of 1951, Vol. VI, No. 1, pp. 73-81.

Regarding comparative examples of the implementation of said cold process, reference may for example be made to the article ½ Industrial and Engineering Chemistry, 1948, Vol. 40, No. 5, pp. 932-937, E. J. Vandenberg, G. E. Hulse, Hercules Powder Company, Wilmington, Del.+ and to the article ½ Industrial and Engineering Chemistry, 1954, Vol. 46, No. 5, pp. 1065-1073, J. R. Miller, H. E. Diem, B. F. Goodrich Chemical Co., Akron, Ohio+.

In the case of an SBR elastomer (ESBR or SSBR), use is especially made of an SBR having an average styrene content, for example of between 20% and 35% by weight, or a high styrene content, for example from 35% to 45%, a content of vinyl bonds of the butadiene part of between 15% and 70%, a content (mol %) of trans-1,4-bonds of between 15% and 75% and a Tg of between −10° C. and −55° C.; such an SBR may advantageously be used as a blend with a BR that preferably has more than 90% (mol %) of cis-1,4-bonds.

It will be noted that it is possible to envisage using one or more natural rubber latices as a blend, one or more synthetic rubber latices as a blend, or a blend of one or more natural rubber latices with one or more synthetic rubber latices.

As the second elastomer of the composition, when it is not a diene elastomer, the following are particularly suitable: non-diene butyl elastomers such as poly(isobutylene) homopolymers or copolymers based on poly(isobutylene) (of course, when it is a question of copolymers with isoprene, the diene elastomers described above are recalled), and also the halogenated derivatives, in particular generally brominated or chlorinated derivatives, of these poly(isobutylene) homopolymers and copolymers based on poly(isobutylene).

Also suitable among the non-diene elastomers are copolymers of isobutylene and of styrene derivatives such as brominated isobutylene/methylstyrene (BIMS) copolymers, to which the elastomer named EXXPRO sold by the company Exxon in particular belongs.

Mention may also be made, as non-diene elastomer particularly suitable for the invention, of non-diene thermoplastic elastomers (TPEs).

Advantageously, the weight fraction of the first diene elastomer in the elastomeric matrix is greater than or equal to 50%, and preferably greater than or equal to 60%.

II-2) Fillers

All carbon blacks, in particular blacks of the HAF, ISAF or SAF type, conventionally used in tyres ("tyre-grade" blacks) are suitable as carbon blacks. Mention will more particularly be made, among the latter, of the reinforcing carbon blacks of the 100, 200 or 300 series (ASTM grades), such as, for example, the N115, N134, N234, N326, N330, N339, N347 or N375 blacks, or else, depending on the applications targeted, the blacks of higher series (for example, N400, N660, N683, N772 or N990).

Also suitable as carbon black are the carbon blacks partially or completely covered with silica via a post-treatment, or the carbon blacks modified in situ by silica such as, non-limitingly, the fillers sold by the company Cabot Corporation under the name Ecoblack™ "CRX 2000" or "CRX 4000".

The expression "inorganic filler" should be understood here, as is known, to mean any inorganic or mineral filler, whatever its colour and its origin (natural or synthetic), also referred to as "white filler", "clear filler" or even "non-black filler", in contrast to carbon black, this inorganic filler being capable of reinforcing by itself alone, without means other than an intermediate coupling agent, a rubber composition intended for the manufacture of a tread for tyres, in other words capable of replacing, in its reinforcing role, a conventional tyre-grade carbon black for a tread. Such a filler is generally characterized by the presence of functional groups, in particular hydroxyl (—OH) groups, at its surface, requiring, in order to be used as a reinforcing filler, the use of a coupling agent or system intended to provide a stable chemical bond between the isoprene elastomer and said filler.

Such an inorganic filler may therefore be used with a coupling agent in order to enable the reinforcement of the rubber composition in which it is included. It may also be used with a covering agent (which does not provide a bond between the filler and the elastomeric matrix) in addition to a coupling agent or not (in this case the inorganic filler does not play a reinforcing role).

The physical state in which the inorganic filler is present is not important, whether it is in the form of a powder, of microbeads, of granules, of balls or any other appropriate densified form. Of course, the expression "inorganic filler" is also understood to mean mixtures of various inorganic fillers, in particular of highly dispersible siliceous and/or aluminous fillers as described below.

Mineral fillers of the siliceous type, in particular silica ($SiO_2$), or of the aluminous type, in particular alumina ($Al_2O_3$), are suitable in particular as inorganic fillers. The silica used may be any silica known to those skilled in the art, especially any precipitated or pyrogenic silica having a BET surface area and a CTAB specific surface area that are both less than 450 m$^2$/g, preferably ranging from 30 to 400 m$^2$/g. Mention will be made, as highly dispersible precipitated silicas ("HDSs"), for example, of the Ultrasil 7000 and Ultrasil 7005 silicas from Evonik, the Zeosil 1165 MP, 1135 MP and 1115 MP silicas from Rhodia, the Hi-Sil EZ150G silica from PPG, the Zeopol 8715, 8745 and 8755 silicas from Huber or the silicas with a high specific surface area as described in application WO 03/16837.

When the compositions of the invention are intended for tyre treads having a low rolling resistance, the inorganic filler used, in particular if it is silica, preferably has a BET surface area of between 45 and 400 m$^2$/g, more preferably of between 60 and 300 m$^2$/g.

Preferably, the inorganic fillers for which the mean size (by weight) is between 20 and 300 nm, more preferably between 20 and 150 nm, are particularly suitable for the present invention. This mean size is conventionally measured after dispersion, by ultrasonic deagglomeration, of the filler to be analysed in water or an aqueous solution containing a surfactant. For an inorganic filler such as silica, the measurement is carried out using an X-ray detection centrifugal sedimentometer of "XDC" ("X-ray disc centrifuge) type, sold by Brookhaven Instruments, according to the following procedure. A suspension of 3.2 g of sample of inorganic filler to be analysed in 40 ml of water is produced by the action over 8 minutes, at 60% power (60% of the maximum position of the "output control"), of a 1500 W ultrasonic probe (¾ inch Vibracell sonicator sold by Bioblock); after sonication, 15 ml of the suspension are introduced into the disc rotating at a speed that varies between 3000 and 6000 rpm (the speed being adapted as a function of the mean size of the filler: the smaller the size, the higher the speed); after sedimentation for 120 minutes, the weight distribution of the particle sizes and the mean size, by weight, of the particles dw are calculated by the software of the "XDC" sedimentometer (dw=Σ(ni di5)/Σ(ni di4) with ni being the number of objects of the size class or diameter di).

Preferably, the content of total filler (carbon black and inorganic filler such as silica) is between 20 and 200 phr, more preferably between 30 and 150 phr and more preferably still between 30 and 100 phr, the optimum being, as is known, different depending on the particular applications targeted: the level of reinforcement expected on a bicycle tyre for example is, of course, less than that required on a tyre capable of running at high speed in a sustained manner, for example a motorcycle tyre, a tyre for a passenger vehicle or for a utility vehicle such as a heavy vehicle.

According to one preferred embodiment of the invention, use is made of carbon black, the content of which varies from 30 to 80 phr, and an inorganic filler, in particular silica, the content of which varies from 5 to 50 phr, more particularly the total filler of the composition comprising carbon black, the content of which varies from 35 to 70 phr, and an inorganic filler, in particular silica, the content of which varies from 5 to 35 phr, more preferably still the total filler comprising carbon black, the content of which varies from 40 to 65 phr, and an inorganic filler, in particular silica, the content of which varies from 10 to 30 phr.

II-3) Masterbatches—Rubber Composition

Advantageously, the masterbatches and the compositions thus produced are capable of being used in tyre applications.

The rubber compositions for tyres based on masterbatches and inorganic filler according to the invention may also comprise, as is known, a coupling agent and/or a covering agent and a vulcanization system.

In order to couple the reinforcing inorganic filler to the diene elastomer, use is made, in a known manner, of an at least bifunctional coupling agent (or bonding agent) intended to provide a satisfactory connection, of chemical and/or physical nature, between the inorganic filler (surface of its particles) and the diene elastomer, in particular bifunctional organosilanes or polyorganosiloxanes.

Use is made in particular of silane polysulphides, referred to as "symmetrical" or "asymmetrical" depending on their particular structure, as described, for example, in applications WO 03/002648 (or US 2005/016651) and WO 03/002649 (or US 2005/016650).

Particularly suitable, without the definition below being limiting, are "symmetrical" silane polysulphides corresponding to the following general formula (III):

$$Z\text{-}A\text{-}S_x\text{-}A\text{-}Z, \text{ in which:} \quad \text{(III)}$$

x is an integer from 2 to 8 (preferably from 2 to 5);

A is a divalent hydrocarbon radical (preferably, $C_1$-$C_{18}$ alkylene groups or $C_6$-$C_{12}$ arylene groups, more particularly $C_1$-$C_{10}$, especially $C_1$-$C_4$, alkylenes, in particular propylene);

Z corresponds to one of the formulae below:

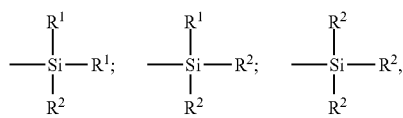

in which:
- the $R^1$ radicals, which are substituted or unsubstituted and identical to or different from one another, represent a $C_1$-$C_{18}$ alkyl, $C_5$-$C_{18}$ cycloalkyl or $C_6$-$C_{18}$ aryl group (preferably, $C_1$-$C_6$ alkyl, cyclohexyl or phenyl groups, in particular $C_1$-$C_4$ alkyl groups, more particularly methyl and/or ethyl);
- the $R^2$ radicals, which are substituted or unsubstituted and identical to or different from one another, represent a $C_1$-$C_{18}$ alkoxyl or $C_5$-$C_{18}$ cycloalkoxyl group (preferably a group chosen from $C_1$-$C_8$ alkoxyls and $C_5$-$C_8$ cycloalkoxyls, more preferably still a group chosen from $C_1$-$C_4$ alkoxyls, in particular methoxyl and ethoxyl).

In the case of a mixture of alkoxysilane polysulphides corresponding to the above formula (III), in particular the standard commercially available mixtures, the mean value of the "x" subscripts is a fractional number preferably between 2 and 5, more preferably close to 4. However, the invention may also advantageously be carried out, for example, with alkoxysilane disulphides (x=2).

Mention will more particularly be made, as examples of silane polysulphides, of bis(($C_1$-$C_4$)alkoxyl($C_1$-$C_4$)alkylsilyl($C_1$-$C_4$)alkyl) polysulphides (in particular disulphides, trisulphides or tetrasulphides), such as, for example, bis(3-trimethoxysilylpropyl) or bis(3-triethoxysilylpropyl)polysulphides. Use is in particular made, among these compounds, of bis(3-triethoxysilylpropyl)tetrasulphide, abbreviated to TESPT, of formula [($C_2H_5O)_3Si(CH_2)_3S_2]_2$, or bis(triethoxysilylpropyl)disulphide, abbreviated to TESPD, of formula [($C_2H_5O)_3Si(CH_2)_3S]_2$. Mention will also be made, as preferred examples, of bis(mono($C_1$-$C_4$) alkoxyldi($C_1$-$C_4$)alkylsilylpropyl) polysulphides (in particular disulphides, trisulphides or tetrasulphides), more particularly bis(monoethoxydimethylsilylpropyl) tetrasulphide, such as described in the aforementioned patent application WO 02/083782 (or US 2004/132880).

Mention will in particular be made, as coupling agents other than an alkoxysilane polysulphide, of bifunctional POSs (polyorganosiloxanes) or else of hydroxysilane polysulphides ($R^2$=OH in the above formula III), such as described in patent applications WO 02/30939 (or U.S. Pat. No. 6,774,255) and WO 02/31041 (or US 2004/051210), or else of silanes or POSs bearing azodicarbonyl functional groups, such as described, for example, in patent applications WO 2006/125532, WO 2006/125533 and WO 2006/125534.

As covering agents, processing aids will generally be considered that are capable, as is known, owing to an improvement in the dispersion of the inorganic filler in the rubber matrix and a lowering of the viscosity of the compositions, of improving their ease of processing in the uncured state, these processing aids being for example hydrolysable silanes, such as alkylalkoxysilanes (especially alkyltriethoxysilanes), polyols, polyethers (for example polyethylene glycols), primary, secondary or tertiary amines (for example trialkanolamines), hydroxylated or hydrolysable POSs, for example □,□-dihydroxy-polyorganosiloxanes (especially □,□-dihydroxypolydimethylsiloxanes), and fatty acids such as, for example, stearic acid.

In the rubber compositions in accordance with the invention, the content of coupling agent is preferably between 0.1% and 12% by weight of the inorganic filler for a CTAB surface area of 160 m$^2$/g, more preferably between 4% and 10% by weight of the inorganic filler for a CTAB surface area of 160 m$^2$/g; and/or the content of covering agent is preferably between 0.1% and 20% by weight of the inorganic filler for a CTAB surface area of 160 m$^2$/g, more preferably between 5% and 20% by weight of the inorganic filler for a CTAB surface area of 160 m$^2$/g, it being possible for the content of coupling agent to be adjusted to the specific surface area of the filler.

A person skilled in the art will understand that a reinforcing filler of another nature, in particular organic nature, might be used as filler equivalent to the reinforcing inorganic filler described in the present section, provided that this reinforcing filler is covered with an inorganic layer, such as silica, or else comprises, at its surface, functional sites, in particular hydroxyls, requiring the use of a coupling agent in order to form the connection between the filler and the elastomer.

These rubber compositions in accordance with the invention may also comprise all or some of the standard additives customarily used in elastomer compositions intended for the manufacture of tyres, in particular treads, such as for example plasticizers or extender oils, whether the latter are of aromatic or non-aromatic type, pigments, protective agents such as antiozone waxes, chemical antiozonants, antioxidants, anti-fatigue agents, reinforcing resins, methylene acceptors (for example, phenolic-novolac resin) or methylene donors (for example, HMT or H3M) as described, for example, in application WO 02/10269, a crosslinking system based on either sulphur or on sulphur donors, and/or on a peroxide and/or on bismaleimides, and vulcanization accelerators.

Preferably, these compositions comprise, as preferred non-aromatic or very weakly aromatic plasticizing agent, at least one compound selected from the group consisting of naphthenic oils, paraffinic oils, MES oils, TDAE oils, glycerol esters (in particular trioleates), hydrocarbon-based plasticizing resins exhibiting a high Tg preferably above 30° C., and mixtures of such compounds.

It should be noted that it is also possible to envisage producing masterbatches in accordance with the invention by incorporating therein, especially before the drying phase, additives as described above—oil, antioxidant, coupling agent, covering agent, etc.

II-4). Manufacture of Rubber Compositions and Masterbatches

The rubber compositions of the invention are manufactured in appropriate mixers, using two successive phases of preparation according to a general procedure well known to those skilled in the art: a first phase of thermomechanical working or kneading (sometimes referred to as a "non-productive" phase) at high temperature, up to a maximum temperature of between 130° C. and 200° C., preferably between 145° C. and 185° C., followed by a second phase of mechanical working (sometimes referred to as a "productive" phase) at lower temperature, typically below 120° C., for example between 60° C. and 100° C., during which finishing phase the crosslinking or vulcanization system is incorporated.

According to one embodiment of the invention, all the base constituents of the compositions of the invention, with the exception of the vulcanization system, are incorporated intimately, by kneading, during the "non-productive" first phase, that is to say at least these various base constituents are introduced into the mixer and thermomechanically kneaded, in one or more steps, until the maximum temperature of between 130° C. and 200° C., preferably between 145° C. and 185° C., is reached.

According to one preferred embodiment of the invention, the second elastomer and the inorganic filler are incorporated into the first diene elastomer and the carbon black which have been previously prepared in the form of a first masterbatch.

Preferably, this first masterbatch is produced in the "liquid" phase. To do so, the process involves the diene elastomer in latex form, which is in the form of water-dispersed elastomer particles, and an aqueous dispersion of the carbon black, that is to say a filler dispersed in water, commonly referred to as a "slurry". More preferably still, the steps of the process described in document U.S. Pat. No. 6,048,923 will be followed, which process consists in particular in incorporating a continuous flow of a first fluid consisting of the elastomer latex into the compounding zone of a coagulation reactor, in incorporating a second continuous flow of a second fluid consisting of the aqueous dispersion of carbon black under pressure into the compounding zone to form a mixture with the elastomer latex, the compounding of these two fluids being sufficiently energetic to make it possible to almost completely coagulate the elastomer latex with the carbon black before the outlet orifice of the coagulation reactor, and then in drying the coagulum obtained.

According to another preferred embodiment of the invention, the inorganic filler and the second elastomer are incorporated into the first masterbatch by also being in the form of a second masterbatch which will have been prepared beforehand. This second masterbatch may be prepared in particular in solid form by thermomechanically kneading the second elastomer and the inorganic filler; it may also be prepared by any other process and in particular it may also be prepared in the liquid phase.

It will be noted in particular that the incorporation of the second elastomer alone and the inorganic filler alone, or in the form of a second masterbatch containing the second elastomer and the inorganic filler, may be carried out at the same time as the introduction into the mixer of the other constituents (especially the first diene elastomer or first masterbatch) but also advantageously that this or these incorporations may be offset in time by a few tens of seconds to a few minutes. In the case of introducing the second elastomer alone and the inorganic filler alone, offset in time by a few tens of seconds to a few minutes, the inorganic filler may be introduced before, after or at the same time as the second elastomer.

By way of example, the (non-productive) first phase is carried out in a single thermomechanical stage during which all the necessary constituents (where appropriate in the form of masterbatches as specified above), the optional complementary covering or processing agents and various other additives, with the exception of the vulcanization system, are introduced into an appropriate mixer, such as a standard internal mixer. The total kneading time in this non-productive phase is preferably between 1 and 15 min.

After cooling of the mixture thus obtained during the non-productive first phase, the vulcanization system is then incorporated at low temperature, generally in an external mixer such as an open mill; all the ingredients are then mixed (productive phase) for a few minutes, for example between 2 and 15 min.

The crosslinking system is preferably a vulcanization system, i.e. a system based on sulphur (or on a sulphur donor) and on a primary vulcanization accelerator. Added to this base vulcanization system are various known secondary vulcanization accelerators or vulcanization activators, such as zinc oxide, stearic acid or equivalent compounds, or guanidine derivatives (in particular diphenylguanidine), incorporated during the non-productive first phase and/or during the productive phase, as described subsequently.

The sulphur is used at a preferred content of between 0.5 and 12 phr, in particular between 1 and 10 phi. The primary vulcanization accelerator is used at a preferred content of between 0.5 and 10 phr, more preferably of between 0.5 and 5.0 phr.

Use may be made, as (primary or secondary) accelerator, of any compound capable of acting as accelerator for the vulcanization of diene elastomers in the presence of sulphur, in particular accelerators of the thiazole type, and also their derivatives, and accelerators of thiuram and zinc dithiocarbamate types. These accelerators are, for example, selected from the group consisting of 2-mercaptobenzothiazyl disulphide (abbreviated to "MBTS"), tetrabenzylthiuram disulphide ("TBZTD"), N-cyclohexyl-2-benzothiazyl sulphenamide ("CBS"), N,N-dicyclohexyl-2-benzothiazyl sulphenamide ("DCBS"), N-(tert-butyl)-2-benzothiazyl sulphenamide ("TBBS"), N-(tert-butyl)-2-benzothiazyl sulphenimide ("TBSI"), zinc dibenzyldithiocarbamate ("ZBEC") and the mixtures of these compounds.

The final composition thus obtained is then calendered, for example in the form of a sheet or slab, especially for laboratory characterization, or else extruded in the form of a rubber profiled element that can be used for example as a tyre tread for a passenger vehicle, heavy vehicle, etc.

III Exemplary Embodiments of the Invention

III.1 Preparation of Masterbatch of Natural Rubber and Carbon Black

The first masterbatches of diene elastomer and carbon black, having a dispersion value of the filler in the elastomeric matrix of greater than or equal to 90, are produced in the liquid phase according to the process described in U.S. Pat. No. 6,048,923.

Thus, a masterbatch is prepared, according to the protocol explained in detail in the aforementioned patent, from carbon black N234 sold by Cabot Corporation, and natural rubber field latex originating from Malaysia and having a rubber solids content of 28% and an ammonia content of 0.3%.

Thus a masterbatch A of natural rubber and carbon black is obtained in which the content of carbon black is 50 phr and which has a dispersion of the black in the natural rubber matrix that has a Z value of 90.

III-2 Preparation of the Rubber Compositions

The control compositions TM are produced according to a conventional process of compounding in solid form in which the elastomer or elastomers, depending on whether the second elastomer is identical to or different from the first elastomer, and the reinforcing filler, including the carbon black N234 sold by Cabot Corporation and, where appropriate, the precipitated silica Ultrasil 7000 sold by Evonik, are introduced in solid form.

The control rubber compositions TA not in accordance with the invention are produced from the masterbatch A, to which is added, according to a conventional process of compounding in solid form, a second elastomer and carbon black N234 sold by Cabot Corporation.

The rubber compositions CA in accordance with the invention are produced from the first masterbatch A, to which is added, according to a conventional process of compounding in solid form, a second elastomer and precipitated silica (powder or granules) Ultrasil VN3 or Ultrasil 7000 sold by Evonik.

The various compositions are produced in the following manner:

The tests below are carried out in the following manner: introduced into an internal mixer, filled to 70%, and the initial vessel temperature of which is around 90° C., are the first masterbatch A for the compositions TA and CA (or the natural rubber in solid form and the N234 carbon black for the compositions TM), a second, identical or different, elastomer, a second reinforcing filler (N234 carbon black or Ultrasil VN3 or Ultrasil 7000 silica), a coupling agent and/or a covering agent where appropriate, followed, after kneading for one to two minutes, by the various other additives, with the exception of the vulcanization system. According to one embodiment variant specified in some of the tests which follow, the second elastomer and the second reinforcing filler, and the coupling agent where appropriate, are introduced in the form of a masterbatch produced beforehand in solid form.

Thermomechanical working (non-productive phase) is then carried out in one stage (total duration of the kneading equal to around 5 min), until a maximum "dropping" temperature of around 165° C. is reached.

The mixture thus obtained is recovered and cooled and then the vulcanization system (sulphur and a sulphenamide accelerator) is added to an external mixer at 70° C., by compounding the combined mixture (productive phase) for around 5 to 6 min. When a covering agent is present, this covering agent may also be introduced into the external mixer instead of being introduced into the internal mixer.

The compositions thus obtained are then calendered either in the form of slabs (thickness of 2 to 3 mm) or thin sheets of rubber for the measurement of their physical or mechanical properties, or in the form of profiled elements that can be used directly, after cutting and/or assembly to the desired dimensions, for example as semi-finished products for tyres, in particular as tyre treads.

In the embodiment variants specified in some of the tests which follow, the masterbatch of the second elastomer and of the second filler (and of the coupling agent where appropriate) is produced by the simultaneous or non-simultaneous introduction of said second elastomer and of said second filler (and of the coupling agent where appropriate) into an internal mixer, then thermomechanical working (non-productive phase) is carried out in one stage (total duration of the kneading equal to around 5 min), until a maximum "dropping" temperature of around 165° C. is reached.

III-3 Example 1

The purpose of this example is to demonstrate the properties of a rubber composition in accordance with the invention based on a blend of natural rubber and styrene/butadiene copolymer, SBR, which properties are improved relative to control compositions based on the same elastomeric blend but that are not in accordance with the invention due to the nature of their reinforcing filler or to their preparation process.

The rubber compositions TM1 and TM2 are prepared "in bulk" from a blend of natural rubber and an SBR, and from carbon black and, where appropriate, silica, in solid form as described in detail in section III-2.

The control composition TA1 and the composition in accordance with the invention CA2 are respectively prepared from a first masterbatch A, to which are added, in solid form, a second elastomer, in this case an SBR, and a second reinforcing filler, respectively carbon black for TA1 or Ultrasil VN3 silica for CA2, according to the process described in detail in section III-2.

The control composition T'A1 and the composition in accordance with the invention C'A2 are respectively prepared from a first masterbatch A, to which are added, in solid form, a masterbatch prepared in solid form also and comprising a second elastomer and a second reinforcing filler, respectively carbon black for T'A1 or Ultrasil VN3 silica for C'A2, according to the process described in detail in section III-2.

All of the compositions, irrespective of the manufacturing process, have the following basic formulation (in phr):

| | |
|---|---|
| natural rubber | 80 |
| SBR (a) | 20 |
| 6PPD (b) | 1.5 |
| Plasticizer (c) | 1 |
| Stearic acid | 2 |
| Zinc oxide (d) | 3 |
| accelerator (e) | 1.1 |
| sulphur | 1.1 |

(a) SSBR with 25% styrene, 25% of 1,2-polybutadiene units and 50% of trans-1,4-polybutadiene units (Tg = −48° C.);
(b) N-1,3-dimethylbutyl-N-phenyl-para-phenylenediamine ("Santoflex 6-PPD" from Flexsys);
(c) MES oil ("Catenex SNR" from Shell);
(d) zinc oxide (industrial grade - Umicore);
(e) N-cyclohexyl-2-benzothiazyl sulphenamide ("Santocure CBS" from Flexsys).

In addition to these constituents, the compositions TM1, TM2, TA1, T'A1, CA2 and C'A2 differ from one another due to the nature and the amount (in phr) of second reinforcing filler that they include, given in detail in Table 1 below.

TABLE 1

| Composition | TM1 | TM2 | TA1 | T'A1 | CA2 | C'A2 |
|---|---|---|---|---|---|---|
| N234 (1) | — | — | 40 | 40 | 40 | 40 |
| N234 (2) | 55 | 40 | 15 | — | — | — |
| N234 (3) | — | — | — | 15 | — | — |
| Silica (4) | — | 15 | — | — | 15 | — |
| Silica (5) | — | — | — | — | — | 1.5 |
| Silane (6) | — | 1.5 | — | — | 1.5 | 1.5 |

(1) carbon black originating from masterbatch A;
(2) carbon black added to the elastomeric blend or to the masterbatch A by standard compounding in solid form;
(3) carbon black originating from the masterbatch containing the second elastomer added to the masterbatch A by standard compounding in solid form;
(4) Ultrasil VN3 silica added to the masterbatch A by standard compounding in solid form;
(5) Ultrasil VN3 silica originating from the masterbatch containing the second elastomer added to the masterbatch A by standard compounding in solid form;
(6) TESPT ("SI69" from Evonik).

The properties measured before and after curing at 150° C. for 40 minutes are given in Table 2 below.

TABLE 2

| Composition | TM1 | TM2 | TA1 | T'A1 | CA2 | C'A2 |
|---|---|---|---|---|---|---|
| Properties before curing | | | | | | |
| Mooney | 56 | 51 | 51 | 48 | 40 | 42 |
| Properties after curing | | | | | | |
| Z value | 79 | 45 | 73 | 71 | 65 | 70 |
| MA100 | 2.1 | 1.7 | 2.2 | 2.2 | 1.9 | 1.8 |
| MA300/MA100 | 1.26 | 1.09 | 1.37 | 1.43 | 1.28 | 1.28 |
| Strain at break | 561 | 612 | 541 | 547 | 595 | 609 |
| Stress at break | 25 | 24 | 25.4 | 26.7 | 24.5 | 24.5 |
| Tan(□□max | 0.206 | 0.167 | 0.192 | 0.196 | 0.141 | 0.144 |

The comparison Of the control composition TM1, for which SBR and carbon black (55 phr) were added, with the composition TM2, for which SBR and black (40 phr) and silica (15 phr) were added, makes it possible to observe that the introduction of silica enables an expected improvement in the hysteresis (drop in tan □) and also an advantage in terms of the strain at break but at the expense of a significant degradation in the dispersion of the reinforcing filler (Z value) and also in the reinforcement (MA100/M1300).

For the composition CA2 produced from the masterbatch A having a good dispersion, in accordance with the invention, and compared to the composition TM2, it is observed that the addition of SBR and of silica to the masterbatch makes it possible not only to lower the hysteresis but also to retain a good dispersion of the reinforcing filler in the composition and to improve the reinforcement (MA300/MA100) enabling values close to the control TM1 to be obtained. It is also observed that the lowering of the hysteresis (16%) and the increase in the reinforcement (17%) for the composition CA2 in accordance with the invention compared to the control composition TM2 are, surprisingly, greater than that which is observed with the addition of SBR and of carbon black to the masterbatch by comparing composition TA1 to composition TM1 (7% drop in hysteresis and 8% increase in reinforcement).

The respective comparison of compositions C'A2 and CA2 or T'A1 and TA1 makes it possible to observe that the method of introducing the second elastomer and the second filler has no impact on the properties obtained. Thus compositions C'A2 and CA2 in accordance with the invention, compared to the control composition TM2, display a greater increase in the reinforcement and a greater reduction in the hysteresis than that which is obtained by comparing compositions T'A1 and TA1 respectively to composition TM1.

III-4 Example 2

The purpose of this example is to demonstrate the properties of a rubber composition in accordance with the invention based on natural rubber, which properties are improved relative to control compositions based on the same elastomer but that are not in accordance with the invention due to the nature of their reinforcing filler or to their preparation process.

The rubber compositions TM3 and TM4 are prepared "in bulk" from natural rubber and from carbon black and, where appropriate, silica, in solid form as described in detail in section III-2.

The composition in accordance with the invention CA4 is prepared from a first masterbatch A, to which is added, in solid Corm, a second elastomer identical to the first elastomer, therefore consisting of natural rubber, and a second reinforcing filler, in this case Ultrasil VN3 silica, according to the process described in detail in section III-2.

The control composition T'A3 and the composition in accordance with the invention C'A4 are respectively prepared from a first masterbatch A, to which are added, in solid form, a masterbatch prepared in solid form also and comprising a second elastomer identical to the first, therefore consisting of natural rubber, and a second reinforcing filler, respectively carbon black for T'A3 or Ultrasil VN3 silica for C'A4, according to the process described in detail in section III-2.

All of the compositions, irrespective of the manufacturing process, have the following basic formulation (in phr):

| | |
|---|---|
| natural rubber (NR) | 100 |
| 6PPD (b) | 1.5 |
| Plasticizer (c) | 1 |
| Stearic acid | 2 |
| Zinc oxide (d) | 3 |
| accelerator (e) | 1.1 |
| sulphur | 1.1 |

In addition to these constituents, the compositions TM3, TM4, TA3, T'A3, CA4 and C'A4 differ from one another due to the nature and the amount (in phr) of second reinforcing filler that they include, given in detail in Table 3 below.

TABLE 3

| Composition | TM3 | TM4 | T'A3 | CA4 | C'A4 |
|---|---|---|---|---|---|
| N234 (1) | — | — | 42 | 42 | 42 |
| N234 (2) | 55 | 42 | — | — | — |
| N234 (3) | — | — | 13 | — | — |
| Silica (4) | — | 13 | — | 13 | — |
| Silica (5) | — | — | — | — | 13 |
| Silane (6) | — | 1.3 | — | 1.3 | 1.3 |

(1) carbon black originating from masterbatch A;
(2) carbon black added to the elastomeric blend by standard compounding in solid form;
(3) carbon black originating from the masterbatch containing the second elastomer added to the masterbatch A by standard compounding in solid form;
(4) Ultrasil VN3 silica added to the masterbatch A by standard compounding in solid form;
(5) Ultrasil VN3 silica originating from the masterbatch containing the second elastomer added to the masterbatch A by standard compounding in solid form;
(6) TESPT ("SI69" from Evonik).

The properties measured before and after curing at 150° C. for 40 minutes are given in Table 4 below.

TABLE 4

| Composition | TM3 | TM4 | T'A3 | CA4 | C'A4 |
|---|---|---|---|---|---|
| Properties before curing | | | | | |
| Mooney | 89 | 81 | 80 | 67 | 66 |
| Properties after curing | | | | | |
| Z value | 66 | 45 | 79 | 63 | 77 |
| MA100 | 2.5 | 1.8 | 2.7 | 2.0 | 1.9 |
| MA300/MA100 | 1.24 | 1.10 | 1.32 | 1.30 | 1.34 |
| Strain at break | 614 | 628 | 516 | 610 | 607 |
| Stress at break | 26.5 | 23.1 | 25.1 | 26.1 | 26.0 |
| Tan(□□max | 0.204 | 0.162 | 0.199 | 0.136 | 0.134 |

The comparison of the control composition TM3, for which NR and carbon black (55 phr) were added, with the composition TM4, for which NR and black (42 phr) and silica (13 phr) were added, makes it possible to observe that the introduction of silica enables an expected improvement in the hysteresis (drop in tan □) but at the expense of a significant degradation in the dispersion of the reinforcing filler (Z value) and also in the reinforcement (MA100/M1300).

For the composition C'A4 produced from the masterbatch A having a good dispersion, in accordance with the invention, and compared to the composition TM4, it is observed that the addition to the masterbatch A of an NR/silica masterbatch produced beforehand by standard compounding in solid form makes it possible not only to lower the hysteresis but also to retain a good dispersion of the reinforcing filler in the composition and to improve the reinforcement (MA300/MA100) enabling values greater than the control TM1 to be obtained. It is also observed that the lowering of the hysteresis (17%) and the increase in the reinforcement (21%) for the composition C'A4 in accordance with the invention compared to the control composition TM4 are, surprisingly, greater than that which is observed with the addition to the masterbatch A of an NR/carbon black masterbatch produced beforehand by standard compounding in solid form by comparing composition T'A3 to composition TM3 (3% drop in hysteresis and 6% increase in reinforcement).

The respective comparison of compositions C'A4 and CA4 makes it possible to observe that the method of introducing the second elastomer and the second filler has no impact on the properties obtained. Thus composition CA4 in accordance with the invention, compared to the control composition TM2, displays an increase in the reinforcement and a reduction in the hysteresis that are comparable to that which is obtained with composition C'A4 in accordance with the invention, compared to the control composition TM2.

III-5 Example 3

The purpose of this example is to demonstrate the obtaining of improved properties of compositions in accordance with the invention, based on natural rubber but having various blends of reinforcing filler (carbon black and silica).

The rubber compositions TM5, TM6 and TM7 are prepared "in bulk" from natural rubber, carbon black and silica, in solid form as described in detail in section III-2.

The compositions in accordance with the invention CA5, CA6 and CA7 are prepared from a first masterbatch A, to which are added, in solid form, natural rubber and silica, according to the process described in detail in section III-2.

All of the compositions have a basic formulation identical to that of Example 2.

They differ from one another by the contents (in phr) of carbon black and of silica as specified in Table 5 below.

TABLE 5

| Composition | TM5 | TM6 | TM7 | CA5 | CA6 | CA7 |
|---|---|---|---|---|---|---|
| N234 (1) |  |  |  | 40 | 35 | 35 |
| N234 (2) | 40 | 35 | 35 |  |  |  |
| Silica (4) | 10 | 10 | 20 | 10 | 10 | 20 |
| Silane (6) | 1 | 1 | 2 | 1 | 1 | 2 |

(1) carbon black originating from masterbatch A;
(2) carbon black added to the elastomeric blend by standard compounding in solid form;
(4) Ultrasil VN3 silica added to the elastomeric blend or to the masterbatch A by standard compounding in solid form;
(6) TESPT ("SI69" from Evonik).

The properties measured before and after curing at 150° C. for 40 minutes are given in Table 6 below.

TABLE 6

| Composition | TM5 | TM6 | TM7 | CA5 | CA6 | CA7 |
|---|---|---|---|---|---|---|
| Properties before curing |  |  |  |  |  |  |
| Mooney | 50 | 49 | 62 | 38 | 35 | 49 |
| Properties after curing |  |  |  |  |  |  |
| MA100 | 2.0 | 1.8 | 1.7 | 2.2 | 1.9 | 2.0 |
| MA300/MA100 | 1.20 | 1.20 | 1.10 | 1.28 | 1.31 | 1.16 |
| Strain at break | 574 | 613 | 636 | 563 | 580 | 584 |
| Stress at break | 25.4 | 26.8 | 26.8 | 25.5 | 26.7 | 24.4 |
| Tan(δ)max | 0.128 | 0.109 | 0.139 | 0.111 | 0.083 | 0.117 |

Compared to the control compositions TM5, TM6, TM7, it is observed that the three compositions CA5, CA6 and CA7, in accordance with the invention and having different blends of reinforcing filler (but that all belong to the ranges of the present invention), all exhibit the compromise of improved properties presented in the preceding examples, namely a reduced Mooney value, an improved reinforcement (MA300/MA100) and a very large drop in hysteresis (16% to 24%), without degradation of the properties of strain and stress at break.

III-6 Example 4

The purpose of this example is to demonstrate the properties of a rubber composition in accordance with the invention based on a blend of natural rubber and polybutadiene, BR, which properties are improved relative to control compositions based on the same elastomeric blend but that are not in accordance with the invention due to the nature of their reinforcing filler or to their preparation process.

The rubber compositions TM8, TM9 and TM10 are prepared "in bulk" from a blend of natural rubber and a BR, and from carbon black and, where appropriate, silica, in solid form as described in detail in section III-2.

The control composition TA8 and the compositions in accordance with the invention CA9 and CA10 are respectively prepared from a first masterbatch A, to which are added, in solid form, a second polybutadiene elastomer and a second reinforcing filler, respectively carbon black for composition TA8 and silica for compositions CA9 and CA10, according to the process described in detail in section III-2.

All of the compositions, irrespective of the manufacturing process, have the following basic formulation (in phr):

| natural rubber | 80 |
|---|---|
| BR (f) | 20 |
| 6PPD (b) | 1.5 |
| Plasticizer (c) | 1 |
| Stearic acid | 2 |
| Zinc oxide (d) | 3 |
| accelerator (e) | 1.1 |
| sulphur | 1.1 |

(f) BR (Nd) with 0.7% of 1,2-; 1.7% of trans-1,4-; 98% of cis-1,4- (Tg = −105° C.).

In addition to these constituents, the compositions TM8, TM9, TM10, TA8, CA9 and CA10 differ from one another due to the nature and the amount (in phr) of second reinforcing filler that they include, given in detail in Table 7 below.

TABLE 7

| Composition | TM8 | TM9 | TA8 | CA9 | TM10 | CA10 |
|---|---|---|---|---|---|---|
| N234 (1) | — | — | 40 | 40 | — | 52 |
| N234 (2) | 55 | 40 | 15 | — | 52 | — |
| Silica (7) | — | 15 | — | 15 | 15 | 15 |
| Silane (6) | — | 1.5 | — | 1.5 | 1.5 | 1.5 |

(1) carbon black originating from masterbatch A;
(2) carbon black added to the elastomeric blend or to the masterbatch A by standard compounding in solid form;
(6) TESPT ("SI69" from Evonik);
(7) Ultrasil 7000 silica added to the elastomeric blend or to the masterbatch A by standard compounding in solid form.

The properties measured before and after curing at 150° C. for 40 minutes are given in Table 8 below.

TABLE 8

| Composition | TM8 | TM9 | TA8 | CA9 | TM10 | CA10 |
|---|---|---|---|---|---|---|
| Properties before curing | | | | | | |
| Mooney | 65 | 62 | 54 | 54 | 64 | 57 |
| Properties after curing | | | | | | |
| Z value | 68 | 61 | 82 | 85 | 64 | 88 |
| MA100 | 2.3 | 1.9 | 2.2 | 1.9 | 2.3 | 2.2 |
| MA300/MA100 | 1.23 | 1.10 | 1.31 | 1.21 | 1.15 | 1.32 |
| Strain at break | 567 | 616 | 573 | 630 | 525 | 507 |
| Stress at break | 26.0 | 24.6 | 26.1 | 25.8 | 22.4 | 23.6 |
| Tan(δ)max | 0.192 | 0.164 | 0.202 | 0.150 | 0.219 | 0.198 |

The comparison of the control composition TM8, for which BR and carbon black (55 phr) were added, with the composition TM9, for which BR and black (40 phr) and silica (15 phr) were added, makes it possible to observe that the introduction of silica enables an expected improvement in the hysteresis (drop in tan □) and also an advantage in terms of the strain at break but at the expense of a degradation in the dispersion of the reinforcing filler (Z value) and also in the reinforcement (MA100/M1300).

For the composition CA9 produced from the masterbatch A having a good dispersion, in accordance with the invention, and compared to the composition TM9, it is observed that the addition of BR and of silica to the masterbatch makes it possible not only to lower the hysteresis but also to retain a good dispersion of the reinforcing filler in the composition and to improve the reinforcement (MA300/MA100) enabling values close to the control TM8 to be obtained. It is also observed that the lowering of the hysteresis (9%) and the increase in the reinforcement (10%) for the composition CA9 in accordance with the invention compared to the control composition TM9 are, surprisingly, greater than that which is observed with the addition of BR and of carbon black to the masterbatch by comparing composition TA8 to composition TM8 (5% rise in hysteresis and 7% increase in reinforcement).

Compared to the control composition TM10, it is observed that composition CA10 in accordance with the invention and having a blend of reinforcing filler that is different from the composition in accordance with the invention CA9 (but that belongs to the ranges of the present invention) exhibits the compromise of improved properties observed with the composition in accordance with the invention CA9, namely a reduced Mooney value, an improved (15%) reinforcement (MA300/MA100) and a drop in hysteresis (10%), without degradation of the properties of strain and stress at break.

All these examples showing compositions that have an identical formulation (in particular same fillers and same content of these fillers) but the preparation method of which, demonstrate the synergy linked to the quality of the dispersion of the filler within the elastomeric matrix and to the nature of the filler added, irrespective of the nature of the second elastomer.

It is surprisingly observed that the addition of silica and of elastomer to a masterbatch displaying a very good dispersion, unlike the addition of carbon black and of elastomer to this same masterbatch, makes it possible to simultaneously obtain good levels of dispersion, high reinforcements and very low hysteresis values. These results demonstrate an advantage of the compositions in accordance with the invention in terms of wear, rolling resistance and temperature of the tyres using these compositions.

The invention claimed is:

1. A process for obtaining a composition based on at least one diene elastomer, a reinforcing filler comprising at least carbon black and an inorganic filler with an inorganic filler content of less than or equal to 50 parts by weight per hundred parts of elastomer, which comprises the following steps:
preparing a first masterbatch comprising the diene elastomer and the carbon black, this first masterbatch having a dispersion of the reinforcing filler in the elastomeric matrix that has a Z value greater than or equal to 90,
the step of preparing the first masterbatch including forming a coagulated mixture of the diene elastomer and the carbon black, and drying the coagulated mixture in order to recover the first masterbatch,
incorporating the inorganic filler, the second elastomer and the other constituents of the composition, with the exception of the crosslinking system, into the dried first masterbatch in a mixer, everything being kneaded thermomechanically until a maximum temperature of between 130° C. and 200° C. is reached,
cooling the combined mixture to a temperature below 100° C.,
subsequently incorporating: the crosslinking system, kneading everything up to a maximum temperature below 120° C.

2. The process according to claim 1, wherein the inorganic filler and the second elastomer are introduced to the first masterbatch simultaneously.

3. The process according to claim 2, wherein the inorganic filler and the second elastomer are introduced in the form of a pre-prepared second masterbatch.

4. The process according to claim 1, wherein the inorganic filler and the second elastomer are introduced separately; the inorganic filler being introduced before or after the second elastomer.

5. The process according to claim 2, wherein the introduction of the inorganic filler and/or of the second elastomer is offset in time by a few tens of seconds to a few minutes relative to the introduction of the first masterbatch into the mixer.

6. The process according to claim 1, wherein the first masterbatch is produced in the liquid phase from at least one elastomer latex and a dispersion of carbon black.

7. A process for obtaining a composition based on at least one diene elastomer, a reinforcing filler comprising at least carbon black and an inorganic filler with an inorganic filler content of less than or equal to 50 parts by weight per hundred parts of elastomer, which comprises the following steps:

preparing a first masterbatch comprising the diene elastomer and the carbon black, this first masterbatch having a dispersion of the reinforcing filler in the elastomeric matrix that has a Z value greater than or equal to 90, incorporating the inorganic filler, the second elastomer and the other constituents of the composition, with the exception of the crosslinking system, into the first masterbatch in a mixer, everything being kneaded thermomechanically until a maximum temperature of between 130° C. and 200° C. is reached, cooling the combined mixture to a temperature below 100° C., subsequently incorporating: the crosslinking system, kneading everything up to a maximum temperature below 120° C., wherein the first masterbatch is produced according to the following successive steps: feeding a continuous flow of a diene elastomer latex to a mixing zone of a coagulation reactor defining an elongate coagulation zone extending between the mixing zone and an outlet orifice, feeding a continuous flow of a fluid comprising a filler comprising carbon black under pressure to the mixing zone of a coagulation reactor to form a coagulated mixture, drying the coagulated mixture in order to recover the first masterbatch.

8. The process according to claim 1, wherein the weight fraction of the first diene elastomer in the elastomeric matrix is greater than or equal to 50%.

9. The process according to claim 1, wherein the first diene elastomer is selected from the group consisting of polybutadienes, natural rubber, synthetic polyisoprenes, butadiene copolymers, isoprene copolymers and blends of these elastomers.

10. The process according to claim 9, wherein the first diene elastomer is a natural rubber.

11. The process according to claim 1, wherein the second elastomer is a diene elastomer.

12. The process according to claim 11, wherein the second elastomer is selected from the group consisting of polybutadienes, natural rubber, synthetic polyisoprenes, butadiene copolymers, isoprene copolymers and blends of these elastomers.

13. The process according to claim 11, wherein the second diene elastomer is identical to the first diene elastomer.

14. The process according to claim 11, wherein the second diene elastomer is a polybutadiene.

15. The process according to claim 11, wherein the second diene elastomer is a butadiene/styrene copolymer.

16. The process according to claim 1, wherein the second elastomer is selected from non-diene elastomers.

17. The process according to claim 1, the inorganic filler is a silica, or a silica-covered carbon black.

18. The process according to claim 1, wherein the content of carbon black is between 30 and 80 phr, and the content of inorganic filler is between 5 and 50 phr.

19. A process for preparing a masterbatch which comprises at least one diene elastomer, a reinforcing filler comprising at least carbon black and an inorganic filler with an inorganic filler content of less than or equal to 50 parts by weight per hundred parts of elastomer, comprising adding to a first diene elastomer and carbon black masterbatch produced according to the following steps:

feeding a continuous flow of a diene elastomer latex to a mixing zone of a coagulation reactor defining an elongate coagulation zone extending between the mixing zone and an outlet, feeding a continuous flow of a fluid comprising a filler comprising carbon black under pressure to the mixing zone of a coagulation reactor to form a coagulated mixture, drying the coagulated mixture in order to recover the first masterbatch, the inorganic filler and at least one second elastomer, identical to or different from the first elastomer, by thermomechanical kneading.

20. The process according to claim 19, wherein the inorganic filler and the second elastomer are introduced simultaneously.

21. The process according to claim 19, wherein the inorganic filler and the second elastomer are introduced in the form of a pre-prepared second masterbatch.

22. The process according to claim 19, wherein the inorganic filler and the second elastomer are introduced separately; the inorganic filler being introduced before or after the second elastomer.

23. The process according to claim 19, wherein the introduction of the inorganic filler and/or of the second elastomer is offset in time by a few tens of seconds to a few minutes relative to the introduction of the first masterbatch into the mixer.

24. The process according to claim 8, wherein the weight fraction is greater than or equal to 60%.

25. The process according to claim 17, wherein the silica is a precipitated silica.

26. The process according to claim 18, wherein the content of carbon black is between 40 and 70 phr and the content of inorganic filler is between 10 and 30 phr.

* * * * *